April 21, 1970   A. ROSSELLO   3,507,070
ARTIFICIAL FISH LURE
Filed May 27, 1968

INVENTOR.
ANTHONY ROSSELLO
BY Edward Halle
ATTORNEY.

United States Patent Office 3,507,070
Patented Apr. 21, 1970

1

3,507,070
ARTIFICIAL FISH LURE
Anthony Rossello, 326 Benson Ave.,
Elmont, N.Y. 11003
Filed May 27, 1968, Ser. No. 732,356
Int. Cl. A01k 85/00
U.S. Cl. 43—42.06                    12 Claims

ABSTRACT OF THE DISCLOSURE

The invention is an artificial fish lure having an elongated body with a longitudinal through opening and a transverse strut to which a longitudinal member, having means to attach a fishing line leader thereto, is slideably connected. The longitudinal member may move laterally within the through opening, thereby causing the body of the fish lure to move in various directions to produce lifelike "swimming action" when the lure is drawn through the water by means of the leader.

---

The invention is an artificial fish lure having a body portion comprising a front and a back with a through opening between the front and the back, and a cross member or rib inside of and transverse to the opening. On the cross member or rib is mounted an elongated member substantially as long as the through opening. The elongated member is slideably mounted to slide along the cross member so that the elongated member may shift and slide within the opening to many different positions. The leader of the fishing line is attached to the front end of the elongated member, and hooks are placed on the artificial fish lure at various points. As the lure is drawn through the water, the effect created by the through opening or tunnel through the body portion in conjunction with the shiftable nature of the central elongated member causes the lure to "swim" in a very life-like manner. The external configuration of the body portion as well as the internal configuration of the through opening may take many forms, and it is also a part of the invention that the front end of the body portion may be shaped to provide different slopes such as an upward or downward slope to provide for different "swimming" effects of the lure.

This invention relates to a novel type of artificial fish lure in which a most natural swimming effect is obtained and which presents an attractive bait for the fish sought to be caught.

It is an object of the invention to provide such an artificial fish lure which will swim in various natural patterns, both on the surface and underneath the water.

It is a further object of the invention to provide such a lure which is relatively inexpensive to manufacture.

It is also an object of the invention to provide such a lure which will be strikingly attractive to fish, and another object of the invention is to provide such a lure which may be adapted to various sizes and shapes to cover a variety of fishing situations.

Figure 1:
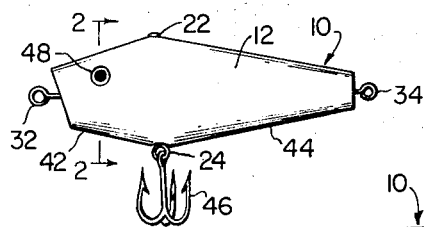
Figure 2:
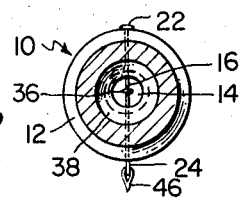
Figure 3:
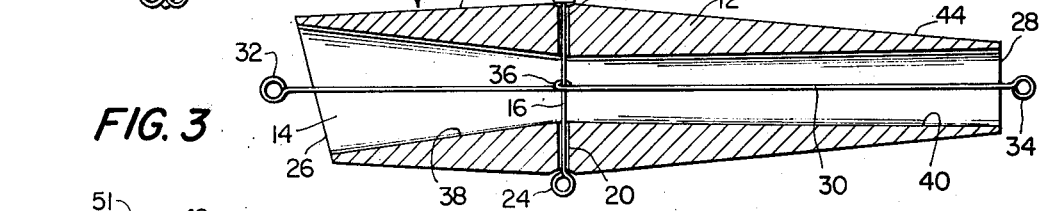

Further objects and advantages will appear in the specification hereinbelow. These objects are achieved with the invention as illustrated in the accompanying drawings in which:

FIG. 1 is a side elevation;
FIG. 2 is a sectional view along the lines 2–2 in FIG. 1;
FIG. 3 is a medial sectional view of a side elevation of a first form of the invention;

2

Figure 4:
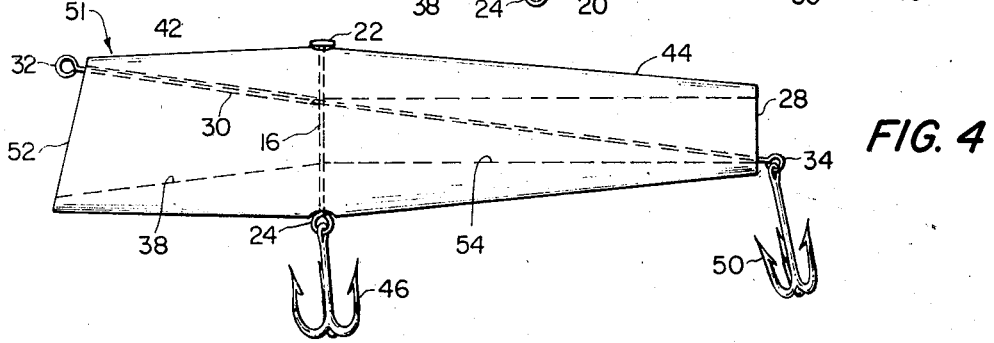
Figure 5:
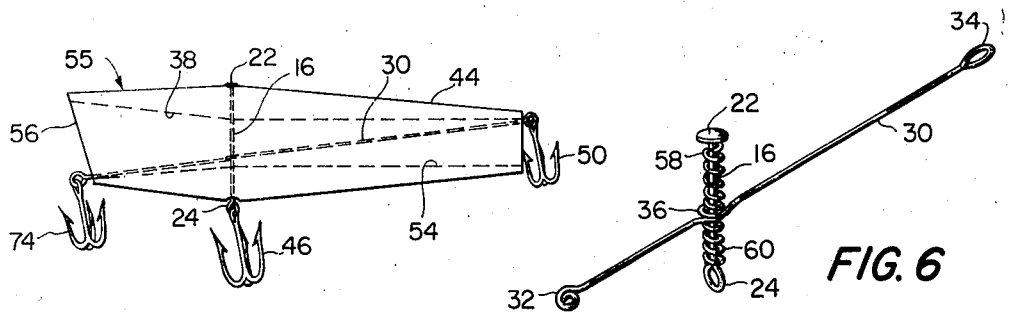
Figure 6:
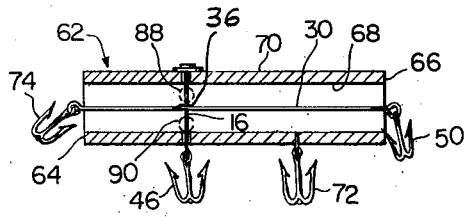
Figures 7, 8:
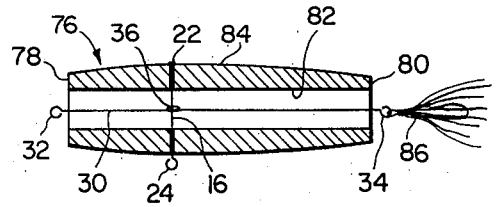

FIG. 4 is a side elevation of a second form of the invention with parts in phantom;
FIG. 5 is a side elevation of a third form of the invention with parts in phantom;
FIG. 6 is a detail in perspective of parts of the invention;
FIG. 7 is a side view in medial cross section of a fourth form of the invention; and
FIG. 8 is a side view in medial cross section of a fifth form of the invention.

Similar numerals refer to similar parts throughout the several views.

The artificial lure 10 is illustrated in FIGS. 1, 2 and 3 of the drawings. FIG. 3 is somewhat enlarged to show the construction in better detail. In this first form of the invention, there is a main body portion 12 having a hollow interior 14 comprising a through opening between the forward end 26 and the rearward end 28. The body portion is provided with a cross member such as a wire or pin 16 which is mounted through a top hole 18 and a bottom hole 20 in the body portion 12. Cross member 16 may be of any construction such as plastic molded integrally with the plastic body portion 12. It is illustrated in the form of a pin 16 as pushed through the holes 18 and 20 of a wooden body portion 12. Reference numeral 22 may define a head for the pin to keep it from slipping through completely, and reference number 24 defines an eyelet formed at the other end of the pin to keep it from pulling through.

I also provide a longitudinal member 30 which may be made of any material. The longitudinal member 30 as shown in FIG. 3 is made of wire, and has a forward eyelet 32 and a rearward eyelet 34 which may be made by curling or bending the ends of the wire or in any other manner known to the art. Longitudinal member 30 is slideably mounted on cross member 16 by means of a slideable coupling 36. In this instance, slideable coupling 36 is merely a bend around in the wire 30 which encompasses cross member 16. However, the coupling may be made in any manner and with any number of extra parts.

In the first form of invention shown in FIG. 3, the through opening 14 does not have a regular diameter throughout its length. Through opening 14 is provided with a slope 38 having a reducing diameter as it runs rearwardly from front toward approximately one-third back from the front at which point the slope changes to slope 40 which has an increasing diameter from approximately one-third back toward the rear. Thus, the combination of slope 38 and slope 40 in through opening 14 provides a sort of double funnel effect. In addition, the body portion 12 of artificial lure 10 has outside slopes such as forward slope 42 which increases in diameter from front to approximately one-third of the rear, and then changes to slope 44 which decreases in diameter from approximately one-third forward to the rear.

Longitudinal member 30 is adapted to slide the full length of cross member 16 within opening 14 from top to bottom, and its ends 32 and 34 may be at any position from up to down as illustrated in the other forms of invention shown in FIGS. 4 and 5.

Thus, I have provided a fishing lure or plug which has a pulling mechanism readily slideable and which may take an infinite number of different positions with relation to the body portion of the plug so as to cause a random natural swimming effect when the plug is pulled by attaching eyelet 32 to a fishing line or leader and pulling the plug either from a boat or casting from the shore.

I have found that by forming forward end 26 with an upwardly forward slope, I have provided an artificial lure 10 which tends to seek the surface of the water and bob about in many directions. Hooks such as hook 46 may be placed on eyelet 24 or a hook such as hook 50 may be placed on eyelet 34 as desired.

In FIG. 4 of the drawings, I show another form of the invention which, although similar, differs slightly from the form shown in FIG. 3. The principal areas of difference are in the rearward slope 54 of the through opening and also in the downwardly forward slope of front end 52. Thus, in artificial lure 51 as illustrated in FIG. 4, the front end slope 52 will cause it to seek to "swim" below the surface of the water, and the non-tapered rear portion 54 of the opening will serve to constrict the flow of water through the opening and provide a different "swimming" effect. Thus, lure 51 has a different front end and a combination funnel front, uniform cylindrical rear opening.

In lure 55 shown in FIG. 5 of the drawings, the inner configuration of the opening is identical to that shown in lure 51. However, the front end 56 is identical to that shown in fishing lure 10. In lure 55, I also provide an additional hook 74 at the front end where the leader or fishing line is connected.

In FIG. 6 of the drawings, I show a detail of the pulling or operating mechanism of the device, and in so doing, I show another form of the invention in which a pair of springs 58 and 60 are spaced or seated between the ends of cross member 16 and the longitudinal member 30. This is to provide restriction to the wiggling motion of the longitudinal member 30, both up and down, and to enhance the result of such wiggling motion by the action of the springs. Thus, another "swimming" pattern can be achieved by the inclusion of the springs 58 and 60.

In FIG. 7 of the drawings, there is a lure 62 which is quite regular in its proportions. It has no diverging or converging slopes, either externally or internally. The forward end 64 and the rearward end 68 are perpendicular to the axis of lure 62. The inside surface 68 and the outside surface of the body portion are quite regular. In this form of the invention, I have provided an extra hook 72 as well as the forward optional hook 74, the usual hook 46, and the tail hook 50.

In FIG. 8, I show another form of the invention as the fishing lure 76. The forward portion or end 78 and the rearward end 80 are perpendicular to its axis. The inside surface 82 is regular. However, the outside surface 84 is curved or boat shaped, and in this form of the invention, I show a different type of hook 86 having feathers or streamers around it. I may also provide optional spacers 88 and 90 as shown in FIG. 7, to restrict the movement of longitudinal member 30 from side to side. The spacers 88 and 90 would be in the form of rings or other stops soldered to cross member 16, and would restrict the lateral movement of longitudinal member 30 in a positive way rather than in the resilient way of the springs 58 and 60.

In all forms of the invention, I find that although the components may be made of any suitable material, I prefer to use bronze wire for the cross member 16 and the longitudinal member 30. The body portion of the invention may be made of any suitable plastic as stated, or it may be of wood or any other suitable material, and may be covered with a coating of paint or any other type of finish coating, either plain or in a design.

Other forms of construction may also be used to assemble the components of the invention together; for example, rather than cross member 16 being a pin as shown in FIG. 3, it could be a bronze wire having the head 22 soldered to it and the eyelet 24 soldered to it. The coupling 36 may be a twist or twists in a bronze wire 30 as shown in FIG. 3, or again, it may be a separate coupling soldered to wire 30. In other words, all of the components of the invention are shown in their preferred forms. However, any other construction suitable to the invention may be used.

In the construction shown, one of the main advantages of the invention is the production of a lure that can be made simply and will have the qualities of natural random swimming action simulating the natural movements of a bait fish.

While I have described my invention in its preferred forms, there are other forms which it may take without departing from the spirit and scope of the invention.

I claim:

1. An artificial fish lure comprising a body including a forward end and a rearward end with a through opening between said forward and rearward ends, a cross member positioned transversely within said opening, a longitudinal member mounted within said opening having a length substantially as great as the length of the opening and being attached to said cross member by means of a slideable coupling, together with at least one fish hook attached to said lure, the length of said cross member being relatively greater than the lateral dimension of the said slideable coupling to permit lateral movement of the longitudinal member within the through opening.

2. The artificial fish lure as defined in claim 1, in which the body is substantially cylindrical in shape.

3. The artifiicial fish lure as defined in claim 1, in which the body has a rounded outer contour which is wider at a point between its ends than at its ends.

4. The artificial fish lure as defined in claim 1, in which the body is substantially round in cross section with a forward slope which increases in diameter from the forward end toward a medial portion of the body and a rearward slope which decreases in diameter from said medial portion toward the rearward end.

5. The artificial fish lure as defined in claim 4, in which the widest medial portion is forward of the center of the body.

6. The artificial fish lure as defined in claim 5, in which the widest medial portion is approximately one-third back from the forward end of the body, and the cross member is substantially within the same plane as the widest portion.

7. The artificial fish lure as defined in claim 1, in which the through bore is provided with a slope having a reducing diameter as it runs rearwardly from said forward end toward a medial portion of said body, with said through bore having a constant diameter from said medial portion toward said rearward end.

8. The artificial fish lure as defined in claim 1, in which the through bore is provided with a slope having a reducing diameter as it runs rearwardly from said forward end toward a medial portion of said body, with said through bore having a slope with an increasing diameter from said medial portion toward said rearward end.

9. An artificial fish lure as defined in claim 1, in which said forward end is provided with an upwardly forward slope.

10. An artificial fish lure as defined in claim 1, in which said forward end is provided with a downwardly forward slope.

11. An artificial fish lure comprising a body including a forward end and a rearward end with a through opening between said forward and rearward ends, a cross member positioned transversely within said opening, a longitudinal member mounted within said opening having a length substantially as great as the length of the opening and being attached to said cross member by means of a slideable coupling, together with at least one fish hook attached to said lure, in which the cross member is provided with spacers positioned on either side of said slideable coupling to restrict the sliding movement of the coupling.

12. An artificial fish lure comprising a body including a forward end and a rearward end with a through opening between said forward and rearward ends, a cross member positioned transversely within said opening, a longitudinal member mounted within said opening having a length substantially as great as the length of the opening and being attached to said cross member by means of a slideable coupling, together with at least one fish hook attached to said lure, in which spring means are positioned between said slideable coupling and the upper and lower ends of said cross member to restrain movement of said longitudinal member along said cross member at said slideable coupling.

References Cited

UNITED STATES PATENTS

| | | | |
|---|---|---|---|
| 567,310 | 9/1896 | Gaide | 43—42.36 X |
| 2,152,275 | 3/1939 | Parkins | 43—42.06 X |
| 2,577,402 | 12/1951 | Carnes | 43—42.36 |

ALDRICH F. MEDBERY, Primary Examiner

D. J. LEACH, Assistant Examiner

U.S. Cl. X.R.

43—42.36